United States Patent
Guimbretiere

(10) Patent No.: US 10,618,216 B2
(45) Date of Patent: Apr. 14, 2020

(54) 3D PRINTING OF ROLLED MATERIALS

(71) Applicant: Cornell University, Ithaca, NY (US)

(72) Inventor: Francois Guimbretiere, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 15/567,320

(22) PCT Filed: Apr. 18, 2016

(86) PCT No.: PCT/US2016/028111
§ 371 (c)(1),
(2) Date: Oct. 17, 2017

(87) PCT Pub. No.: WO2016/168822
PCT Pub. Date: Oct. 20, 2016

(65) Prior Publication Data
US 2018/0162045 A1    Jun. 14, 2018

Related U.S. Application Data

(60) Provisional application No. 62/149,000, filed on Apr. 17, 2015.

(51) Int. Cl.
*B32B 37/00* (2006.01)
*B29C 64/147* (2017.01)
*B29C 64/141* (2017.01)
*B29C 64/321* (2017.01)
*B29C 64/223* (2017.01)
*B31D 5/00* (2017.01)
*B33Y 10/00* (2015.01)
*B33Y 30/00* (2015.01)
*B33Y 40/00* (2020.01)

(52) U.S. Cl.
CPC ......... *B29C 64/147* (2017.08); *B29C 64/141* (2017.08); *B29C 64/223* (2017.08); *B29C 64/321* (2017.08); *B31D 5/00* (2013.01); *B29C 2793/0072* (2013.01); *B33Y 10/00* (2014.12); *B33Y 30/00* (2014.12); *B33Y 40/00* (2014.12)

(58) Field of Classification Search
CPC ......... B29C 53/82; B29C 59/00; B29C 59/04; B29C 59/043; B29C 64/147
See application file for complete search history.

(56) References Cited

U.S. PATENT DOCUMENTS

| 4,476,742 A | 10/1984 | Midgley |
| 4,680,077 A | 7/1987 | Hodgson |
| 8,931,322 B2 * | 1/2015 | Holmquist ............. B23K 26/38 72/203 |

(Continued)

*Primary Examiner* — Joseph S Del Sole
*Assistant Examiner* — Thu Khanh T Nguyen
(74) *Attorney, Agent, or Firm* — Hodgson Russ LLP

(57) ABSTRACT

A shape can be 3D printed by advancing a continuous length of material past a cutting head, cutting the material along one or more paths, providing adhesive on a surface of the material, and spirally winding the material onto a spool, such that the cut paths on each layer of the spiral are in alignment according to the 3D printed shape. A 3D printing system includes a material infeed configured to provide a supply of sheet material, a cutting head for cutting the material, a glue applicator, and a gathering spindle configured to rotate such that the material is spirally wound onto the spindle.

22 Claims, 8 Drawing Sheets

(56) References Cited

U.S. PATENT DOCUMENTS

| | | | |
|---|---|---|---|
| 2003/0006001 A1* | 1/2003 | Yang | B33Y 30/00 156/250 |
| 2004/0026010 A1* | 2/2004 | Mastro | B29C 53/58 156/159 |
| 2004/0259661 A1 | 12/2004 | Chen | |
| 2007/0000604 A1 | 1/2007 | Lyon | |
| 2007/0134467 A1 | 6/2007 | Sayers | |
| 2008/0097398 A1* | 4/2008 | Mitelberg | A61M 25/0043 83/39 |

* cited by examiner

DIGITAL MODEL

SPIRAL SLICING

LASER CUTTING, ROLLING, AND GLUING

PHYSICAL MODEL

3D PRINTING OF ROLLED MATERIALS

CROSS-REFERENCE TO RELATED APPLICATIONS

This application claims priority to the provisional patent application filed Apr. 17, 2015 and assigned U.S. App. No. 62/149,000, the disclosure of which is hereby incorporated by reference.

STATEMENT REGARDING FEDERALLY SPONSORED RESEARCH

This invention was made with government support under contract no. 1422106 awarded by the National Science Foundation. The government has certain rights in the invention.

FIELD OF THE DISCLOSURE

The disclosure relates to 3D printing, and more particularly to 3D printing using rolled materials.

BACKGROUND OF THE DISCLOSURE

The advent of inexpensive 3D printers has revolutionized the way people are designing. By simplifying the fabrication process, it is possible for anyone using a CAD system to produce articles in a wide variety of materials including felt and fabric. While the felt and the fabric printer represent a great improvement compared to the traditional hand assembly of fabric patches, fabric printers are still very slow and it is not unusual for all but the simplest models to take several hours to print. This limits the scope of design exploration that can be achieved within in a regular workday.

3D printing techniques using pre-manufactured sheets of material are based on a Cartesian layer stacking approach in which the object is built by piling up layers of material on top of each other. This approach is simple to implement but is lacking in speed because it is an inherently discrete process. In contrast, the fastest 2D printing systems use a continuous process, and existing label cutting machines can print and cut labels at a rate in excess of 100 meters/min using a gonio head to drive a cutting laser.

Although an increasing number of materials have become available for 3D printing soft objects, they cannot offer the rich textures of materials like felt or fabric. In an effort to bridge this gap, other systems fabricate 3D objects with needle felted yarn or print complex 3D geometries using a stack of fabric sheets. These approaches, as well as other layer-based printers are slow because of a discrete printing process.

Reducing the cycle time between an idea and its physical instantiation is advantageous for improving the design process because it allows users to explore more ideas in a given time frame. Towards that aim, low-fidelity prototyping has been proposed. This sort of approach trades accuracy of representation for speed, a common trade-off in other areas of design, such as interface design where paper mock-ups are a common part of the early design cycle. To date, such fast, low-fidelity prototypes are not available for fabric printing, and recent breakthroughs in the printing speed for hard or rubber-like models (e.g., faster resin curing, or use of prefabricated voxels) are not suitable for printing soft fabric objects.

Therefore, what is needed is an improved 3D printer.

BRIEF SUMMARY OF THE DISCLOSURE

In an instance, a method of 3D printing a shape is provided. The method comprises advancing a continuous length of material past a cutting head; cutting the material along one or more paths; providing adhesive on a surface of the material; and spirally winding the material onto a spool such that the cut paths on each layer of the spiral are in alignment according to the 3D printed shape. The adhesive may be applied on the material after the step of cutting the material.

The method may further include advancing a continuous length of a second material past a second cutting head; cutting the second material along one or more paths; providing adhesive on a surface of the second material; and spirally winding the material onto the spool such that the first and second materials are concentrically wound.

In another instance, a system for 3D printing a shape is provided. The system comprises a material infeed configured to provide a supply of sheet material; a cutting head for cutting the material; a glue applicator; a gathering spindle configured to rotate such that the material is spirally wound onto the spindle; and a controller that electronically communicates with the cutting head and the glue applicator. The cutting head is configured to move along at least one axis. The controller is configured to send instructions to the cutting head and the glue applicator whereby a desired pattern is cut into the material to form a 3D article. The cutting head can include a laser for cutting the material or a blade for cutting the material.

The cutting head can be configured to move in a plane which is substantially parallel to the material when the material is in a print area. The cutting head can be configured to move in a direction transverse to a direction of material travel. The cutting head can be configured to move along two axes.

The material can be moved through the system by rotating the gathering spindle.

The system can further include a feeder. The material can be moved through the system by the feeder. The feeder may be a feed roller.

The spindle can be configured to rotate about an axis of the spindle.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments and examples, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Figure 10:
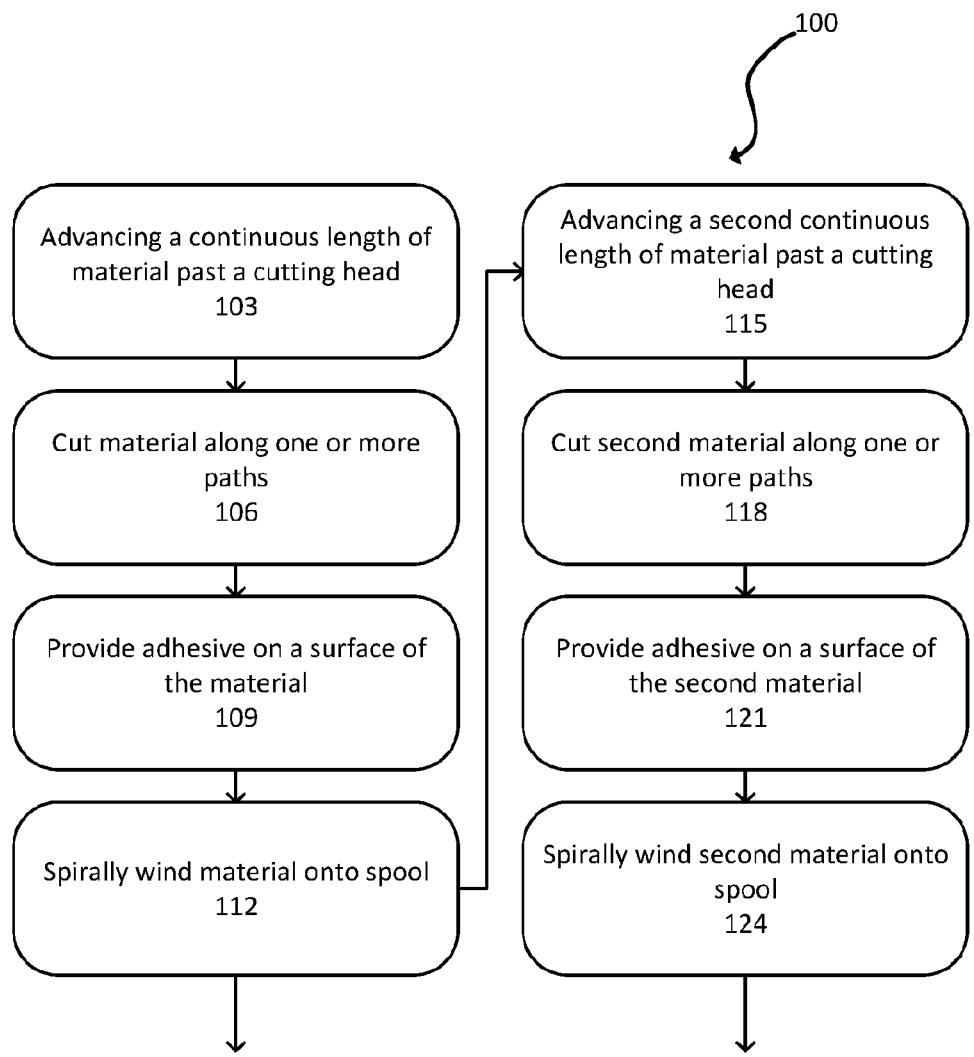
FIG. 10 is a flowchart of an embodiment in accordance with the disclosure.

In an aspect, the present disclosure may be embodied as a method 100 for 3-dimensional ("3D") printing of a shape, as explained in the flowchart of FIG. 10. The method 100 comprises advancing 103 a continuous length of material past a cutting head. Suitable materials include any material that can be cut and rolled onto a spool, for example, textiles (woven, unwoven, or composite), paper, metal sheet, plastic sheet, etc., and including combinations of such materials.

The material is cut 106 along one or more paths. The material may be cut 106 using any suitable technique for cutting the selected material. For example, the material may be cut 106 using a knife or other blade, a laser, a water jet, a plasma jet, etc. Multiple such cutting techniques may be used, for example, one or more laser cutting heads may be used each having one or more lasers for cutting the material. In this way, the material may be cut 106 along more than one path at the same time. In some embodiments, the material is continuously advanced 103 past the cutting head such that the material does not come to rest while being cut. In other embodiments, the material is advanced 103 until a portion of the material to be cut is in a cutting area. The portion to be cut is then cut while the material is at rest, and the material is advanced again to be the next portion to be cut into the cutting area.

An adhesive is provided 109 on a surface of the material. The adhesive may be provided 109 to the surface by spraying, spreading with a knife, or otherwise. The adhesive may be provided 109 before or after the material is cut 106. If adhesive is provided 109 after the material is cut 106, then the adhesive may be provided 109 to only those portions of the material which make up the final 3D shape. In this way, adhesive is not wasted on material which is does not make up the final 3D shape. The material is spirally wound 112 onto a spool such that the cut paths on each layer of the resulting spiral are in alignment according to the 3D printed shape. In this way, the waste material can be removed along the cut lines to reveal the printed 3D shape.

In some embodiments, a continuous length of a second material is advanced 115 past a second cutting head. The second material is cut 118 along one or more paths. Adhesive is provided 121 on a surface of the second material. The second material is spirally wound 124 onto the spool such that the first and second materials are concentrically wound in the printed shape. The second material and the processing of the second material may be the same or different as that of the first material. For example, the second material may be the same as or different from the first material. The cutting technique for the second material may be the same or different from the cutting technique of the first material. The adhesive provided 121 to the second material and/or the technique used to apply the adhesive to the second material may be the same or different as that for the first material.

Figure 1:
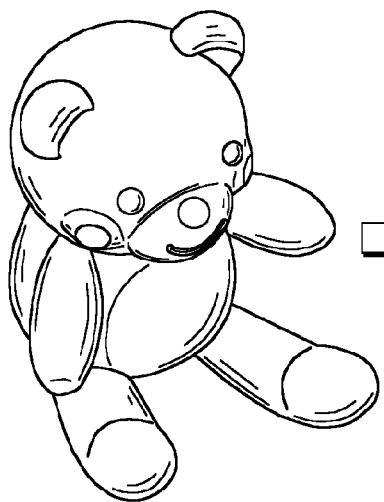
FIG. 1 is a diagram showing the principle of operation. A physical model is created by rolling a pattern of felt around a spindle.
Figure 1:
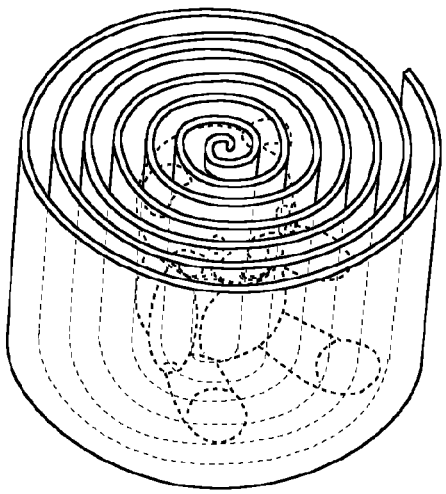
Figure 1:
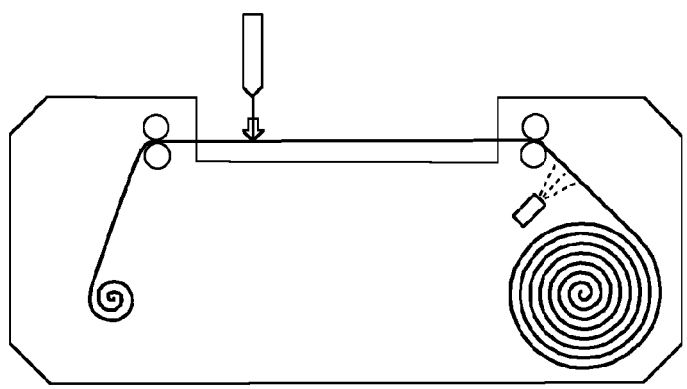
Figure 1:
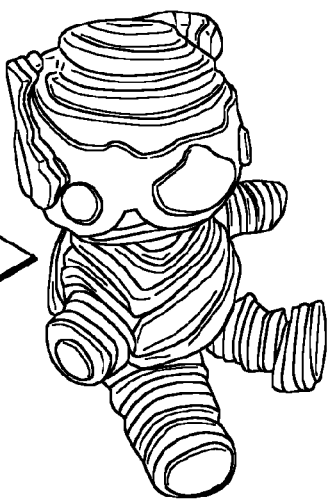

The present disclosure provides alternative slicing techniques for 3D printing with materials like fabric. The techniques disclosed herein provide faster printing of fabric-based 3D objects through the use of a more continuous printing process based on rolling the material around a spindle, which can rotate about its axis. It should be noted that the scope of this disclosure need not be limited to fabrics, but includes 3D printing for materials available in rolls such as fabric. The term fabrics is used throughout this disclosure for convenience, and should be read to include other materials such as, for example, felt, leather, paper, corrugated paper, plastics, metals, rubber, and a wide variety of other materials that are available in rolls and are appropriate for cutting. In an exemplary embodiment of the disclosure seen in FIG. 1, the intersection of the model to be printed is first computed with a roll of material completely encompassing the object, such as the digital model of the bear seen in FIG. 1. The resulting outline is scored on a roll of fabric using a laser cutter before being, glued, and spooled on a spindle. After peeling away the excess material, the printed 3D model is obtained, such as the physical model of a bear in FIG. 1.

An exemplary apparatus is implemented according to the disclosure as an add-on or extension to a large format laser cutter (e.g., 3DRolling). Its use for printing a variety of models in felt is disclosed. The feasibility of printing 3D objects by rolling a pattern of material around a spindle is also disclosed.

Using 3DRolling, a model of the Stanford Bunny was printed in 15 minutes. This is a speed up of more than 10× compared to a previous Cartesian layer approach to printing the same model. Faster speeds can be obtained in other embodiments using mirror-based laser cutters which can cut rolls of fabric in a continuous manner. The present techniques can significantly improve the interactivity of fabric model design, are simpler than existing systems, and are also safer than existing systems because the laser casing creates a Class 1 laser system.

Figure 2:
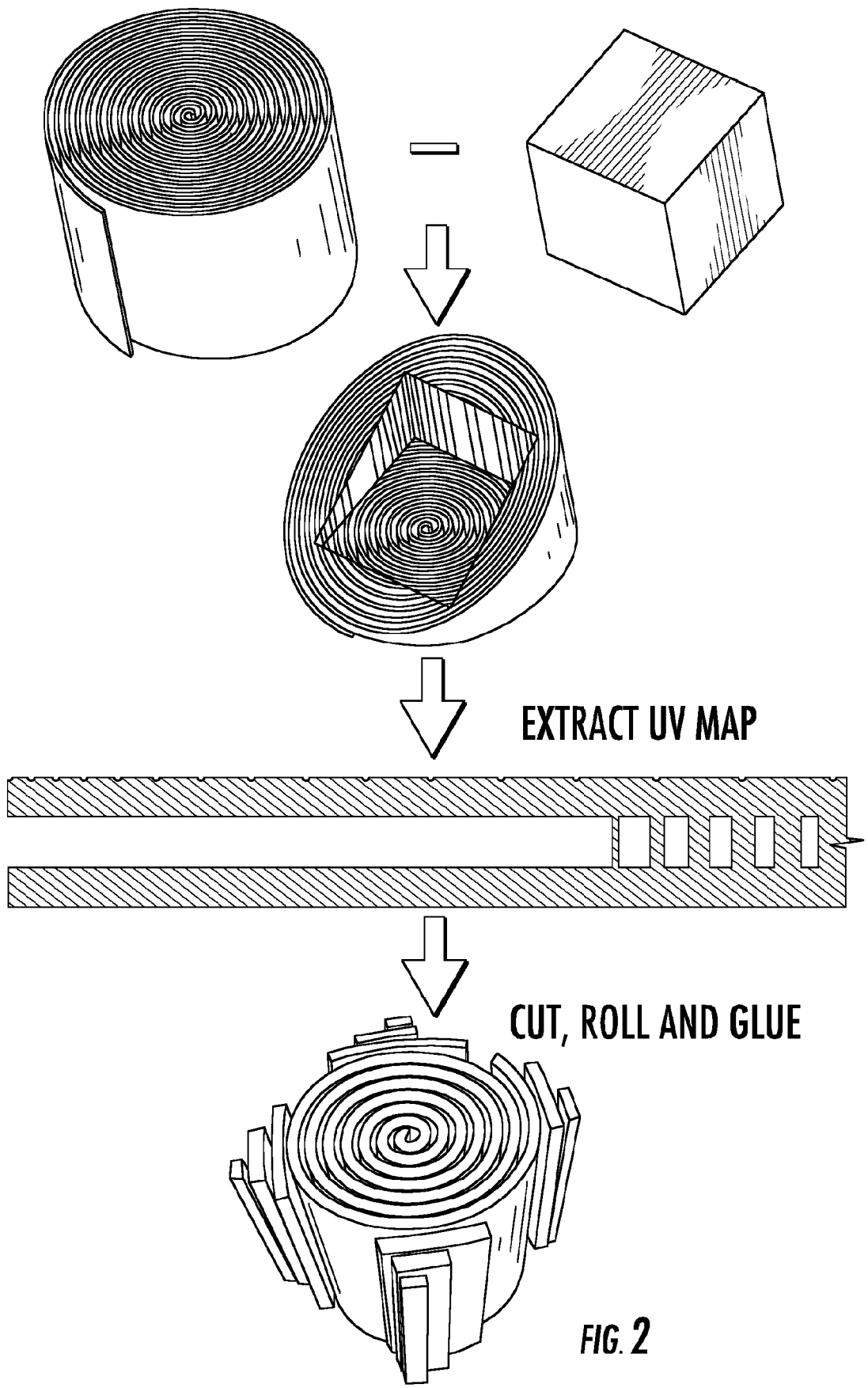
FIG. 2 is a diagram showing the progression from digital model to rolled fabric model.

An exemplary embodiment of the process, shown in FIG. 2, comprises 3 phases: 1) creating the cut pattern; 2) laser cutting the pattern on a roll handler as the system simultaneously applies glue to the fabric; and 3) manually removing the excess material from the printed roll.

Each of these steps is described in more detail with reference to an exemplary apparatus.

Creating the Cut Pattern

To create the cut pattern, the target model is subtracted from a spiral model representing the roll to be printed (FIG. 2, top). The UV map of the outer surface of the resulting solid is exported and processed to remove any unwanted edges resulting in the basic cut pattern (FIG. 2, middle). The resulting drawing is segmented into pages and sent to the laser cutter as a sequence of jobs to be processed under the control of the roll handler mechanism (FIG. 2, bottom).

Roll Handler

Figure 3:
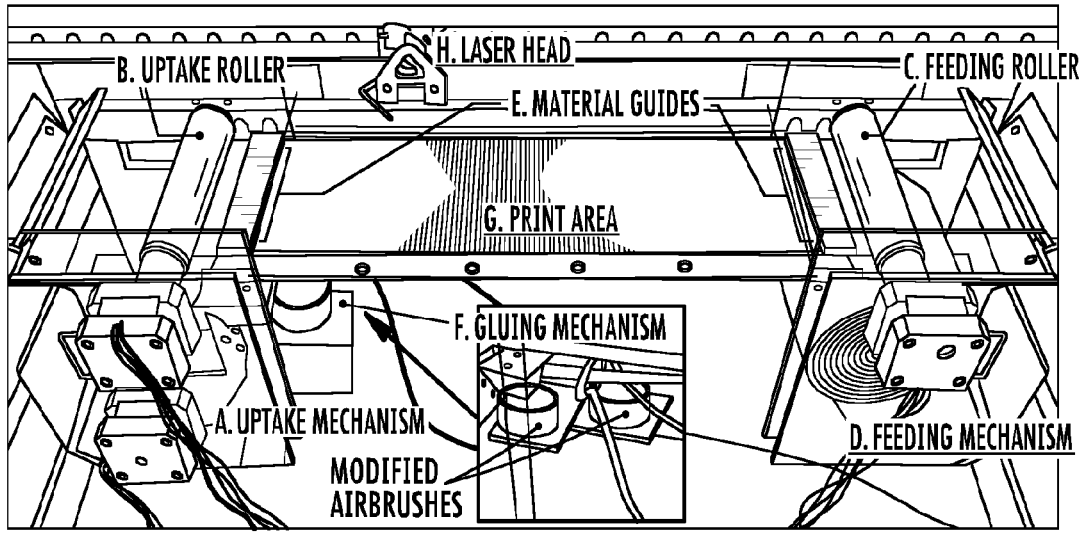
FIG. 3 is a perspective view of a rolling system inside a laser cutter.

The present roll-based approach to 3D printing includes the handling of long rolls of fabric. For example, creating a cylinder that is 10 cm in diameter requires 4 m of felt (assuming felt that is 1.95 mm thick). It may be very tedious to handle this roll manually, so in the exemplary embodiment, an apparatus was created as an add-on to a laser cutter (which includes the laser head at 'H') as shown in FIG. 3. The system is controlled by a microcontroller which ensures the proper sequence of operations, given the number of frames in the model. The entire sequence of frames is provided to the laser cutter. For each frame in the laser cutter's print queue, the roll-handler first triggers the laser cutter to cut the pattern, and, upon completion, controls stepper motors to roll the completed frame into the gathering spindle (FIG. 3 at 'A') from the material infeed (FIG. 3 at 'D'), simultaneously pulling the next frame of material into the cutting area. The material infeed may be referred to or include a feed roller or feeding roller. Two stepper-driven rolls (FIG. 3 at 'B' and 'C') on each side of the cutting area to flatten the fabric. A third stepper is used to spin the spindle gathering the material (FIG. 3 at 'A'). The material passes the glue applicator. In this example, the gluing mechanism (FIG. 3 at 'F') includes airbrushes modified to spray glue on the material.

Figure 4:
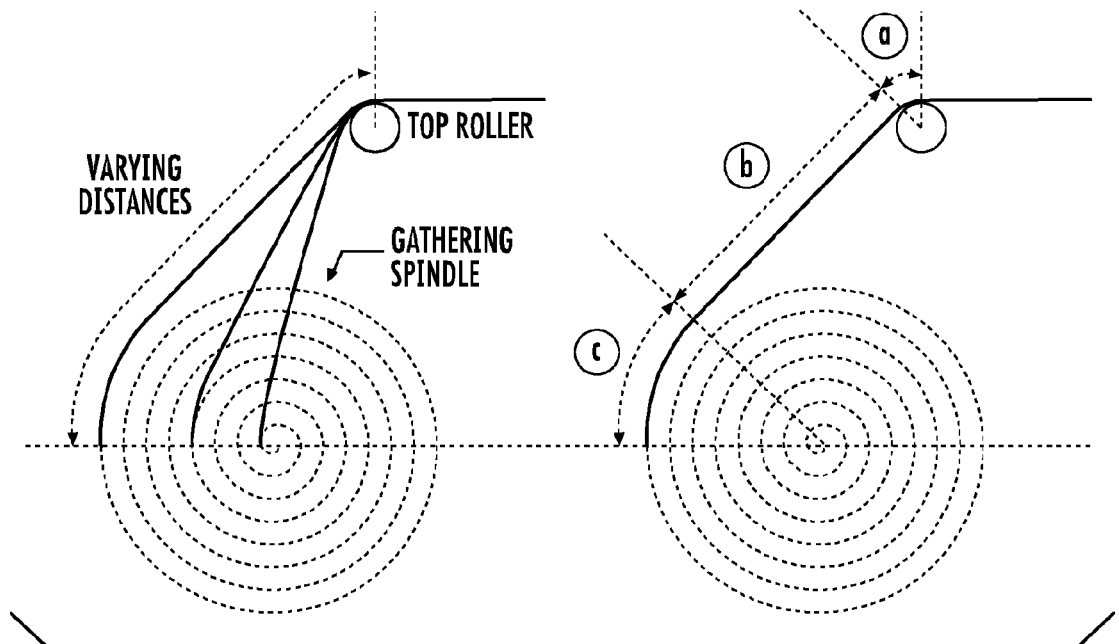
FIG. 4 is a diagram showing how distance (a+b+c) is calculated each time the gathering spindle is turned and compensates for the difference by adjusting the amount of felt the top roller dispenses.

For the print to be successful, it is advantageous to take into account the geometry of the fabric as it is being rolled. In particular, as shown in FIG. 4, the length of fabric between the top roller and the gathering spindle changes as the radius of the gathered fabric changes. This small variation is taken into account to provide a well-aligned printing. Once the rolling for the current frame is completed, the cycle starts again with the microcontroller initiating the cut of the next frame.

A rider cylinder can be used as the material is rolled. This rider cylinder can pull the fabric and make sure it is not stretched when being spooled. In an example, the rider cylinder can be at least partly above the roll where material is gathered and the material goes around the rider cylinder before being spooled. Glue can be applied while the material is on the rider cylinder or near the rider cylinder.

Cutting and Gluing

A cutting head can be used to cut the material and may include an electromechanical actuator or robotic system that enables movement of the cutting head. The cutting head may include, for example, a laser or blade, such as the laser head in FIG. 3 (at 'H'). The cutting head can move along at least one axis, such as along two axes. For example, the cutting head is configured to move in a plane which is substantially parallel to the material in a print area of the system. The movement of the cutting head may be transverse to a direction of material travel.

The glue for binding the material is sprayed during the rolling phase (FIG. 3, at 'F'). The exemplary system utilized Fast Tack Water Based Adhesive 1000NF (manufactured by 3M), a water-based, low VOC glue, designed specifically to be sprayed on fabric. The use of low VOC glue may be advantageous to reduce the risk of fire if gluing fumes remain present during subsequent cutting operations. Other types of glue for fabric or other materials may be used.

Figure 5:
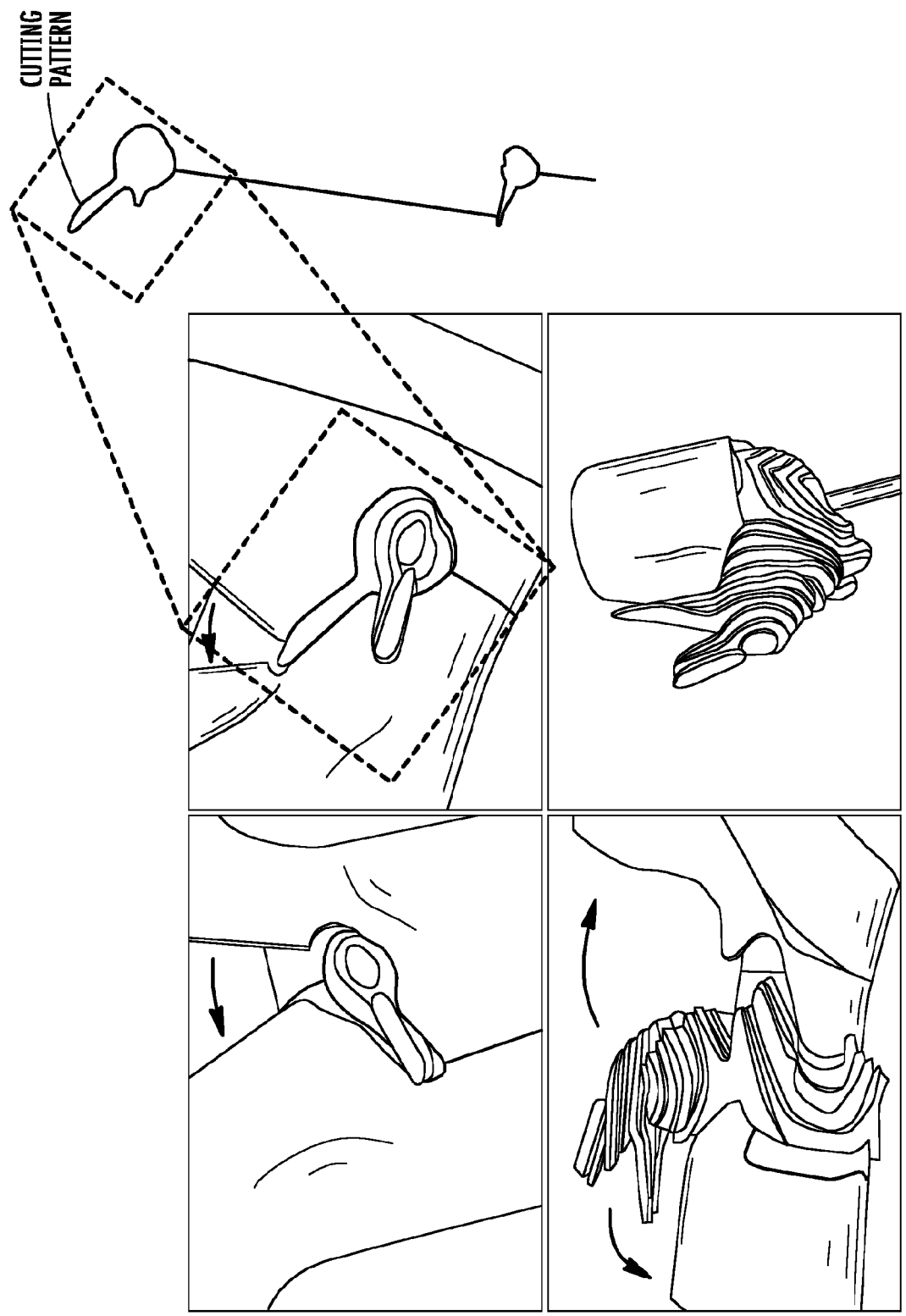
FIG. 5 shows the peeling process. The disclosed script adds peeling lines to the cut pattern (left), which results in a stepwise peeling process (right).

Once the last frame of the model has been processed, the user can open the laser cutter cover and remove the roll of fabric with the model inside. As in other layer-based systems, the user may need to remove the unwanted material by hand or using tools when the print is completed. To simplify this operation, embodiments may provide cut lines (for example, using the UV map processing script) between the model patches to simplify peeling (FIG. 5). These lines may be created by connecting each patch to each closest neighbor in a tree-like manner (FIG. 5 cutting pattern on right). This leads to a simple peeling process in which the user can quickly pull away the top and bottom support before removing any remaining inner support areas (FIG. 5 right). This may be accomplished more easily right after printing, before the glue has set.

The material is spirally wound onto a spool. The cut paths on each layer of the spiral can be in alignment according to the 3D printed shape.

Feedback

A PID feedback controller, such as a strain gauge, can be used to verify that there is a constant force being applied to the material.

Figure 9:
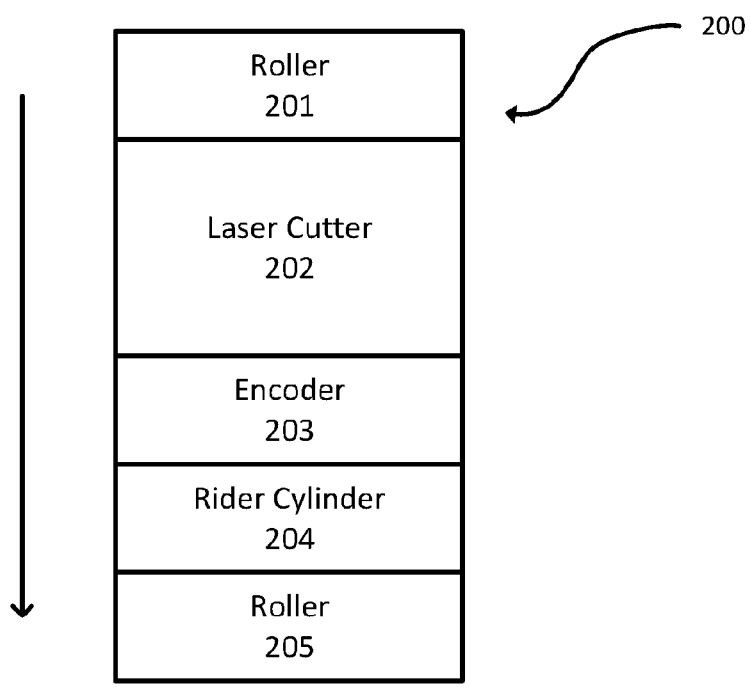
FIG. 9 is a block diagram of movement of material through an embodiment of the system.

A wheel encoder can measure the length of fabric being processed at a given time. The information from the wheel encoder can be used to spool the material in a smooth, well-aligned manner. This is seen in FIG. 9 in which the arrow on the left side represents the motion of the material through the components of the system 200. The encoder 203 is downstream of the roller 201 and laser cutter 202. The rider cylinder 204 and roller 205 are downstream of the encoder 203. The roller 205 downstream of the encoder 203 may be configured to move up and down, such as in an axis perpendicular to the movement of the material through the laser cutter 202.

Implementation

In the exemplary implementation, a 3D content-creation program, such as Blender (created by the Blender Foundation), is used to perform the geometric subtraction of the model to be printed from the spiral model of the fabric. This operation automatically updates the UV map of the outside surface of the spiral model, which can then be exported as a 2D SVG image. All internal edges in the 2D image are removed using an illustration program, such as Adobe Illustrator, path merge before running a python script that modifies this SVG image by adding additional peeling lines for easy support removal. The script also splits up the single SVG image into separate pages, sized 8 inch×4 inch each, corresponding to the size of the rolling mechanism's cut area.

Hardware

One or more controllers are used to control the rolling of the material, application of the glue, and/or the laser cutter. The controller or controllers send instructions to enable a desired pattern to be cut into the material to form a 3D article. A board manufactured by Arduino controls the roller handler. An isolation board using reed relays was built for the Epilog laser cutter. With its help, the board can simulate button presses and detect job completion when the laser cutter's beeper is activated. Having direct access to the cutter firmware can further streamline this interface. The exemplary system did not implement an automatic roll loader, so after printing the first frame the user attaches it to the spindle with tape.

The glue is sprayed using three siphon airbrushes for which the air supply is controlled by a solenoid valve connected to the board. To avoid clogging due to the rapid airflow in the laser cutter, the raw glue was diluted with water using a 1:40 water:glue volume ratio.

Material

The exemplary apparatus implemented the disclosed technique on felt. The present approach can accommodate a wide variety of other materials that are available in rolls and are appropriate for cutting. This includes, without limitation, fabric, leather, paper, corrugated paper, and some plastics. The use of thinner material potentially provides a higher resolution.

In some embodiments, more than one material can be "printed" (i.e., cut) and concentrically wound on the spindle. For example, fabric and paper could be printed on the fly to create a pattern throughout the printing volume. In another embodiment, the material is a wood veneer. In an embodiment using wood veneer, a piece of wood could be unfurled or spirally sliced, cut, and re-wound to create a sculpture that respects the wood grain.

Gluing

The exemplary apparatus applies a uniform coat of glue on the surface of the fabric. A sprayer, roller, sponge, or other device can be used to apply a uniform coating of glue. After printing, the excess material is peeled before the glue sets. However, the model is still fragile during the peeling process and can lead to glue residue on the outside of the model. In some embodiments, application of the adhesive is selective.

Other techniques can be used to apply glue to the material. For example, the glue pattern may only need a low-precision application, so an apparatus may have a row of nozzles to print a low resolution glue pattern on the material.

Localized glue application is possible. In an example, a defocused laser beam can be used to activate thermally activated glue that is used in fabric construction. UV light also can be used to selectively cure a UV-curable glue. In another example, multiple glue applicators can be used for localized glue application. In another example, a print head can be used to apply the glue in a particular pattern. In another example, the cutter can be used to simultaneously create a gluing mask on a different roll. Other embodiments of applying adhesive will be apparent in light of the present disclosure.

The glue applicator can be configured to move. This may enable localized application of glue, may stop the flow of glue, or may enable different parts of the system to be accessed.

Results

Figure 6A:
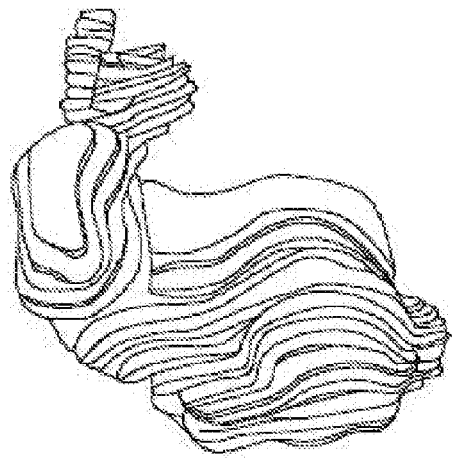
FIGS. 6A and 6B shows Stanford Bunnies printed using an exemplary system. The bunnies were rendered using different orientations.
Figure 6B:
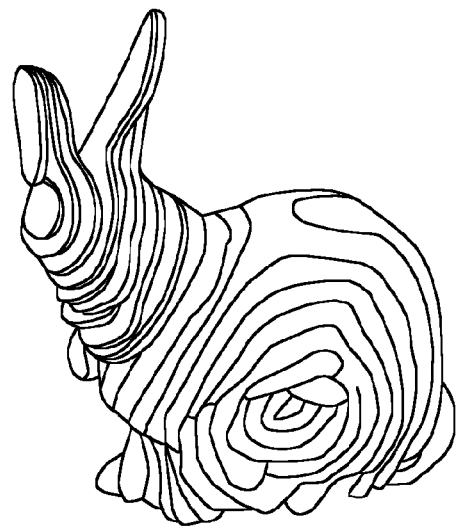
Figure 6C:
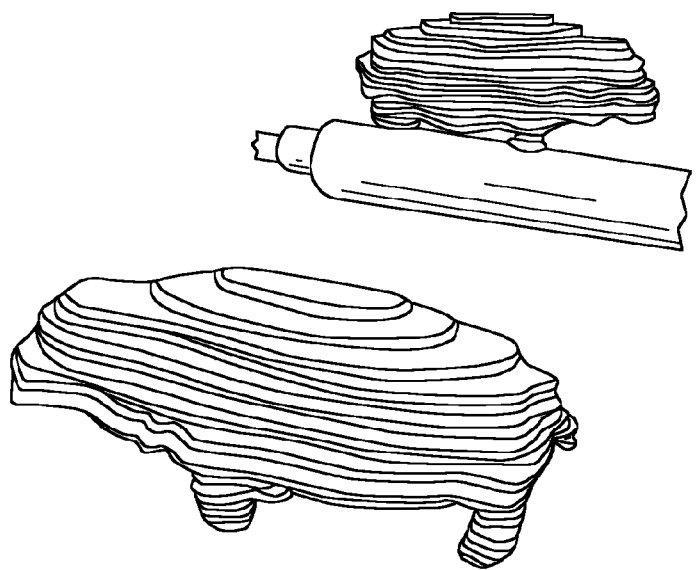
FIG. 6C shows a hippopotamus printed using the technique of the present disclosure and illustrates that, at sufficient distance from the spindle, the rendering is similar to a Cartesian system.

In FIGS. 6A-6C, we show a series of 3D prints made with the exemplary system. As in the Cartesian approach, the orientation of the model has an impact on both the visual appearance and the strength of the model. We illustrate this with a rendering of the Stanford Bunny which is printed in two different orientations for comparison purposes (FIGS. 6A and 6B).

Both models were created with the spindle near the center of the model. It is possible to create a renderings closer to Cartesian renderings by placing the model further away from the spindle as illustrated by the hippopotamus model in FIG. 6C.

With respect to speed, while the current implementation does not offer a fully continuous printing process, it can print a 7 cm tall Stanford Bunny (FIG. 6B) in 12 minutes, a more than 10× speedup compared to the printing time for the same Stanford Bunny model as reported previously. The hippopotamus (FIG. 6C) took 11 mins 30 seconds.

Waste

Like other roll-based implementations, embodiments of the present method may generate of a significant amount of waste material, as seen in FIG. 5. In some embodiments, the quantity of waste may be reduced by altering the placement of the model within the roll and/or by printing several models at once on the same roll. Waste material, such as felt, paper, or denim, also can be recycled into new rolls of material.

Speed

In the exemplary embodiment described above, a factor limiting the speed may be the movement speed of the cutter. The models shown here were cut at 30% speed and 85% power on a 40 W Epilog laser cutter. The system architecture can be configured to perform a continuous cut. The speed of the system also could be improved by using a gonio head to control the movement. Such systems can perform continuous cutting with a scanning speed in excess of 10 m/s, much faster than the system in the exemplary implementation. Industrial installations of 3D label cutters can custom cut adhesive labels at rates up to 100 m/min.

Although the exemplary embodiment employed pinching rollers other approaches may be used. For example, the roll may be driven by a roller acting on the uptake roller (FIG. 3 at 'B'). In another example, a driving roll is placed directly on top of the roll of material. Such configuration would also allow the application of pressure to the fabric as it is rolled which may further improve the quality of the adhesive bond.

Other Printing Embodiments

Figure 7:
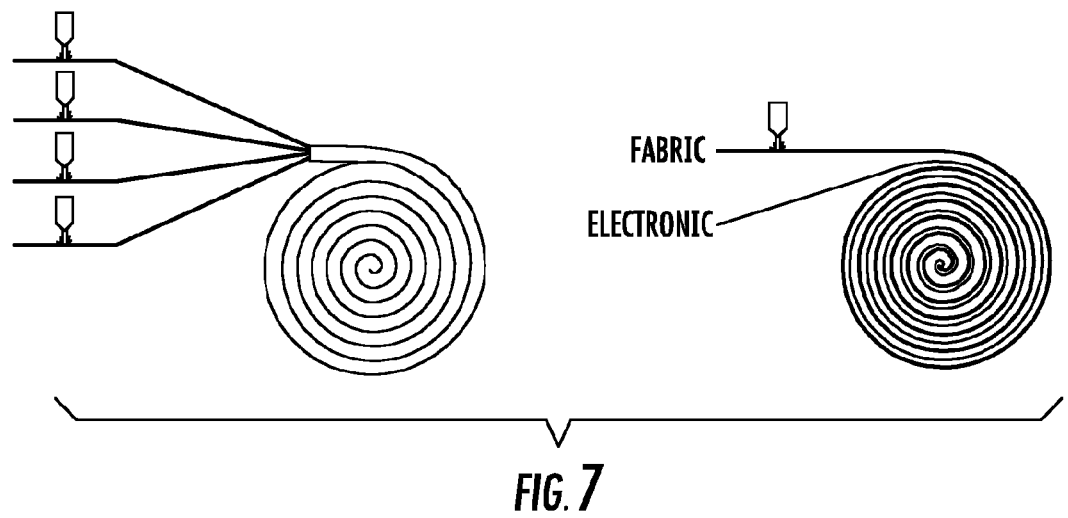
FIG. 7 shows roll processing would allow for the composition of multiple rolls either to speed up the printing process (left) or to create composite materials (right).

In some embodiments of the present disclosure, several layers of material are fed onto the spindle simultaneously, thereby producing a roll of concentrically wound spirals (FIG. 7). This could be used to speed up printing by combining layers of the same material, creating composite materials, or integrating sensing, computing, or other elements directly into the printout.

Figure 8:
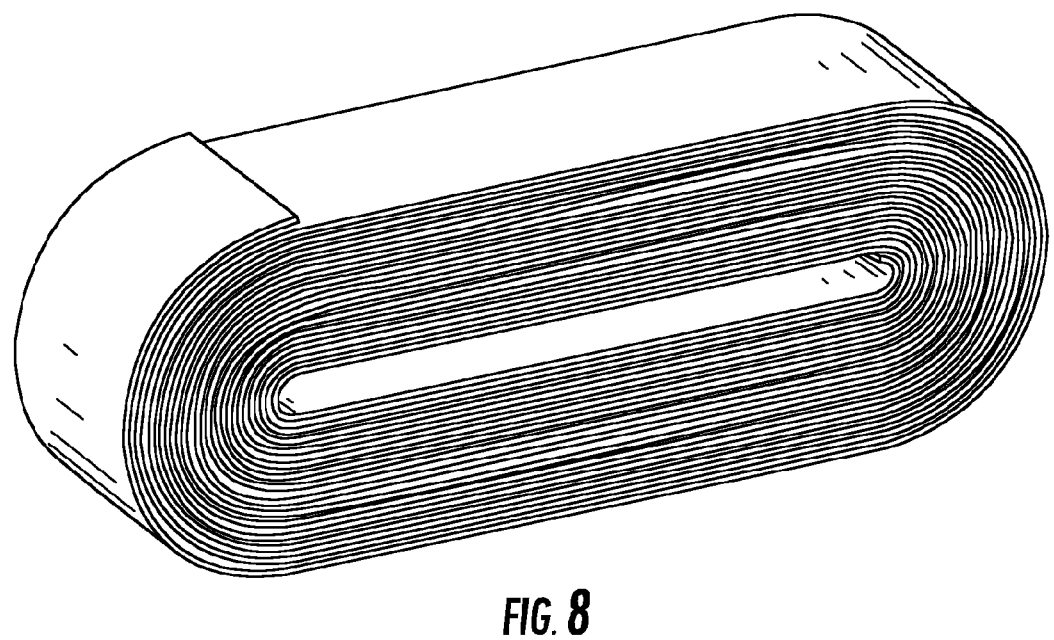
FIG. 8 is a view of fabric that has been wound using an oblong spool.

The material is not always rolled in a circular manner. As seen in FIG. 8, the fabric or other material may be rolled in an oblong spool.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A method of 3D printing a shape, comprising:
   advancing a continuous length of material past a cutting head;
   cutting the material along one or more paths; and
   spirally winding the material onto a spool in successive layers such that the cut paths on each layer of the spiral are in alignment according to the 3D printed shape, wherein the 3D printed shape comprises a plurality of layers of the material.

2. The method of claim 1, further comprising:
   advancing a continuous length of a second material past a second cutting head;
   cutting the second material along one or more paths;
   providing adhesive on a surface of the second material; and
   spirally winding the material onto the spool such that the first and second materials are concentrically wound with alternating layers.

3. The method of claim 1, further comprising providing adhesive on a surface of the material.

4. The method of claim 3, wherein the adhesive is applied on the material after the step of cutting the material.

5. The method of claim 3, wherein the adhesive is applied in a pre-defined pattern on a surface of the material.

6. The method of claim 3, wherein the adhesive is applied only to the portions of material which make up the final 3D printed shape.

7. The method of claim 3, further comprising removing the excess material before the adhesive sets.

8. The method of claim 1, further comprising generating UV maps to create the cut pattern.

9. The method of claim 1, wherein the material cut comprises segmented pieces to form the final 3D printed shape.

10. The method of claim 1, further comprising obtaining a digital model defining the 3D printed shape.

11. A system for 3D printing a shape comprising:
a material infeed configured to provide a supply of sheet material;
a cutting head for cutting the material, wherein the cutting head is configured to move along at least one axis;
a gathering spindle configured to rotate such that the material is spirally wound onto the spindle; and
a controller configured to perform the method of claim 1.

12. The method of claim 1, further comprising removing the excess material along the cut lines to reveal the 3D printed shape.

13. A system for 3D printing a shape comprising:
a material infeed configured to provide a supply of sheet material;
a cutting head for cutting the material, wherein the cutting head is configured to move along at least one axis;
a glue applicator;
a gathering spindle configured to rotate such that the material is spirally wound onto the spindle in successive layers;
and a controller that electronically communicates with the cutting head and the glue applicator, wherein the controller is configured to send instructions to the cutting head and the glue applicator whereby a desired pattern is cut into the material such that the cut paths on each layer of the material are in alignment to form a 3D article when spirally wound on the spindle, wherein the 3D article comprises a plurality of layers of the material.

14. The system of claim 13, wherein the cutting head includes a laser for cutting the material.

15. The system of claim 13, wherein the cutting head includes a blade for cutting the material.

16. The system of claim 13, wherein the cutting head is configured to move in a plane which is substantially parallel to the material when the material is in a print area.

17. The system of claim 13, wherein the cutting head is configured to move in a direction transverse to a direction of material travel.

18. The system of claim 13, wherein the cutting head is configured to move along two axes.

19. The system of claim 13, wherein the material is moved through the system by rotating the gathering spindle.

20. The system of claim 13, further comprising a feeder, and wherein the material is moved through the system by the feeder.

21. The system of claim 20, wherein the feeder is a feed roller.

22. The system of claim 13, the spindle is configured to rotate about an axis of the spindle.

* * * * *